United States Patent [19]

Hsu

[11] Patent Number: 5,482,306
[45] Date of Patent: Jan. 9, 1996

[54] CHAINLESS TRANSMISSION MECHANISM FOR BICYCLES

[76] Inventor: Sung-Hua Hsu, P.O. Box 82-144, Taipei, Taiwan

[21] Appl. No.: 353,807

[22] Filed: Dec. 12, 1994

[51] Int. Cl.⁶ .................................................. B62M 1/02
[52] U.S. Cl. ............................................................ 280/260
[58] Field of Search ................................. 280/236, 238, 280/259, 260

[56] References Cited

U.S. PATENT DOCUMENTS

| | | | |
|---|---|---|---|
| 2,181,424 | 11/1939 | Glacy et al. | 280/260 |
| 3,861,715 | 1/1975 | Mendoza | 280/260 |
| 4,943,077 | 7/1990 | Lin et al. | 280/260 |
| 5,299,819 | 4/1994 | Leu | 280/260 |

Primary Examiner—Mitchell J. Hill
Attorney, Agent, or Firm—Alfred Lei

[57] ABSTRACT

A chainless transmission mechanism for a bicycle, including a right bottom bracket bearing axle holder and a left bottom bracket bearing axle holder bilaterally connected to the bottom bracket of a bicycle by connecting tubes and cone and locknuts to hold a bearing axle, a gear box coupled to one end of the freewheel hub of the bicycle, a transmission shaft having a bevel gear at one end engaged with a bevel gear in the bottom bracket bearing axle holder and a bevel gear at an opposite end engaged with a bevel gear on the freewheel hub, the bevel gear on the freewheel hub being mounted directly on the chain seat of the freewheel hub for gear clusters by a tightening up screw.

1 Claim, 8 Drawing Sheets

CHAINLESS TRANSMISSION MECHANISM FOR BICYCLES

BACKGROUND OF THE INVENTION

Figure 1:
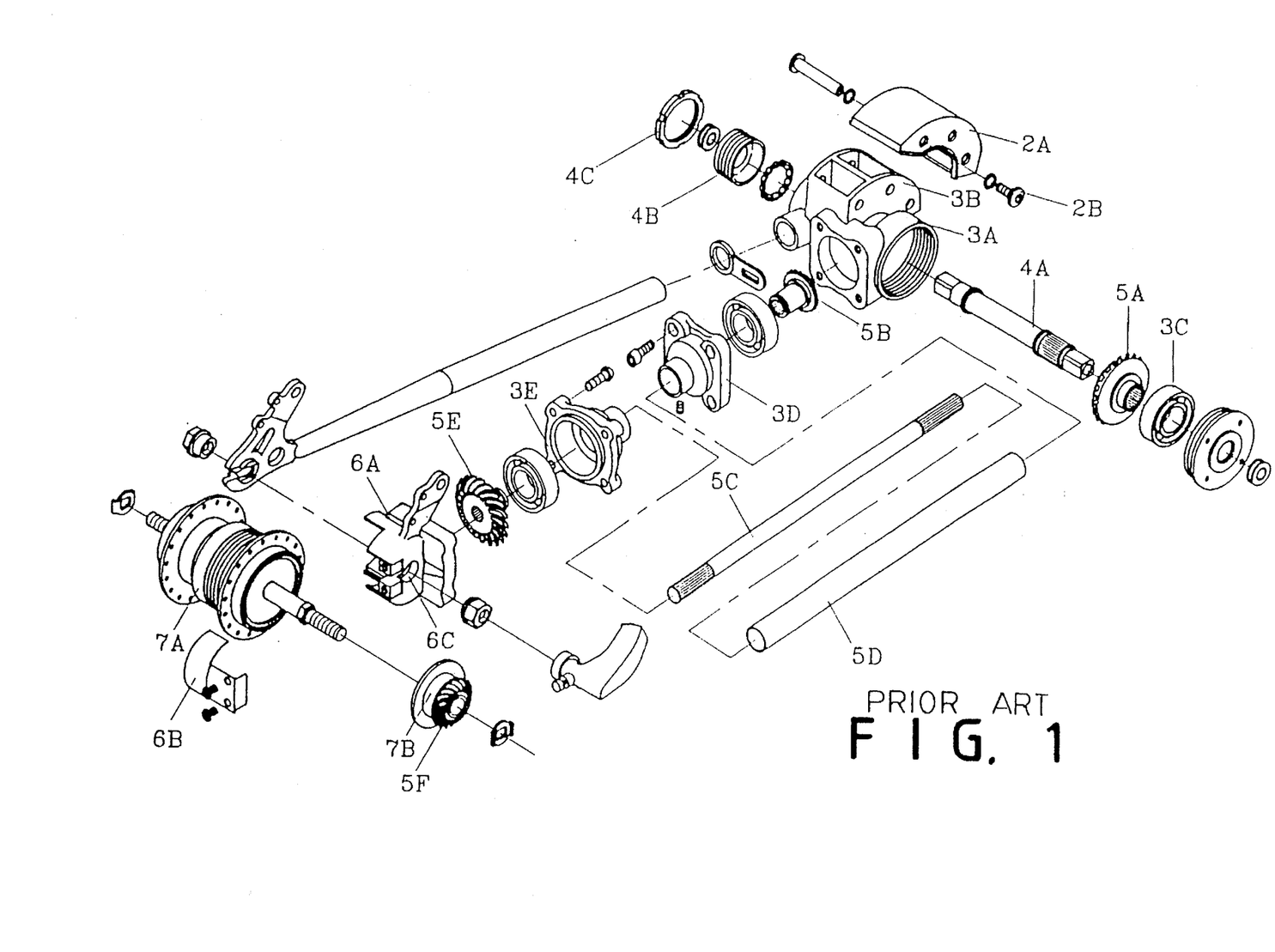
FIG. 1—explosive view of a chainless transmission mechanism according to the prior art.
Figure 2:
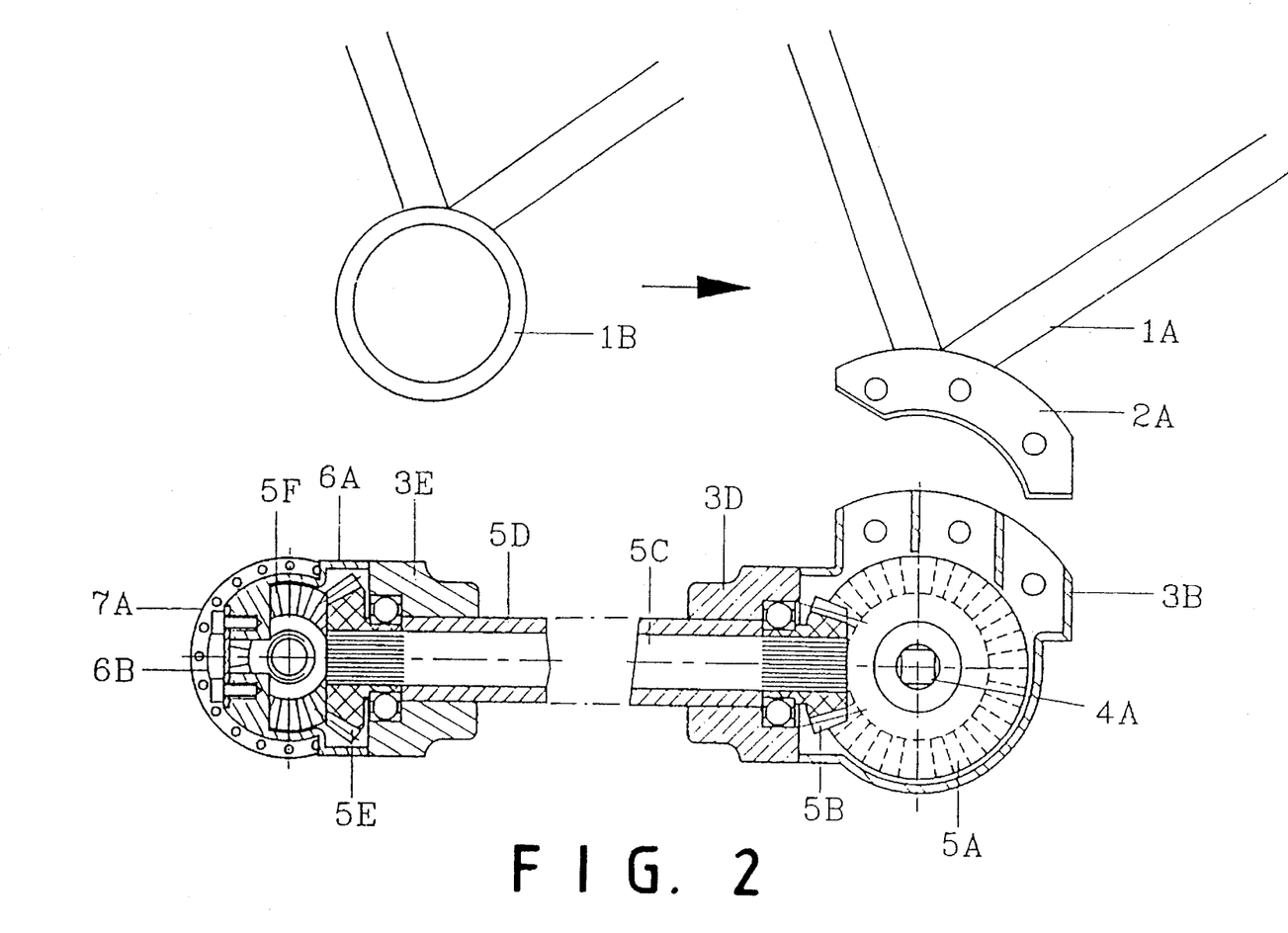
FIG. 2—side view of the chainless transmission mechanism according to the prior art.

FIGS. 1 and 2 show a chainless transmission mechanism for bicycles according to the prior art. This structure of chainless transmission mechanism comprises bottom bracket shell 3A' having a top mounting to BB cap 2A which is welded to the bicycle frame 1A', a axle 4A' fastened to the bottom bracket shell 3A' by bearings 3C' and fastening elements 4B' and 4C', a gear box 6A having a horizontal mounting slot 6C' coupled to the freewheel hub 7A' and covered by a rear cover 6B', a sleeve 5D' connected between the bottom bracket shell 3A' and the gear box 6A' by connectors 3D' and 3E', a transmission shaft 5C' received in the sleeve 5D', a first pair of bevel gears 5A' and 5B' coupled between the axle 4A' and the transmission shaft 5C', and a second pair of bevel gears 5E' and 5F'. When the axle 4A' is rotated, the transmission shaft 5C' is turned by the first pair of bevel gears 5A' and 5B' to rotate the freewheel hub 7A' through the second pair of bevel gears 5E' and 5F'. However, this structure of chainless transmission mechanism is still not satisfactory in function. The drawbacks of this structure of chainless transmission mechanism is outlined hereinafter.

1. The bottom bracket 1B' of the bicycle frame 1A' must be cut away, and then a frame 2A' which fits over the top mounting frame 3B' of the bottom bracket bearing axle holder 3A' must be welded to the bicycle frame 1A' to replace the bottom bracket 1B' for mounting the bottom bracket bearing axle holder 3A'. The bottom bracket shell 3A is fastened to the frame 2A by screw bolts 2B. This arrangement complicates the installation procedure of the chainless transmission mechanism.

2. Because the horizontal mounting slot 6C' of the gear box 6A' is a backward opening, the wheel hub 7A may disconnect from gear box 6A easily when the bicycle runs over a rough road. Furthermore, the rear fender and adjacent parts of the bicycle must be dismounted from the bicycle frame if the wheel hub 7A has to be dismounted from the gear box 6A for a repair work.

3. The bevel gear 5F' which is to be coupled to the freewheel hub 7A' has a coupling portion 7B' in shape and function similar to that of the chain seat for the freewheel gear cluster, and the chain seat of the freewheel hub 7A' must be removed before the installation of the bevel gear 5F'. This arrangement also complicates the installation procedure of the chainless transmission mechanism. When the chain seat of the freewheel hub is removed, it can no longer be used. Furthermore, removing the original chain seat from the freewheel hub will relatively affect the structural strength of the freewheel hub.

SUMMARY OF THE INVENTION

This invention relates to transmission mechanisms for bicycles, and relates more particularly to a chainless transmission mechanism for bicycles.

According to one aspect of the present invention, a right bottom bracket bearing axle holder and a left bottom bracket bearing axle holder are provided and connected together by a scrow bolt, cone and locknuts for holding the bearing axle. The right and left bottom bracket bearing axle holders are directly fastened to the bottom bracket of the bicycle frame at two opposite sides by bearings, cone, and locknuts, without changing the structure of the bottom bracket of the bicycle frame. According to another aspect of the present invention, the mounting slot on the gear box for coupling with the freewheel hub is a downward opening for allowing one end of the wheel hub to be mounted into the gear box from the bottom part. Therefore, the gear box does not displace when it bears the backward pressure from the bicycle rider. According to still another aspect of the present invention, the bevel gear which is coupled to the freewheel hub has a side screw hole for fastening to the chain seat of the freewheel hub by tightening the screw. Therefore, it is not necessary to remove the chain seat from the freewheel hub during the installation of the chainless transmission mechanism.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

For the purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Referring to FIGS. 3 through 6, the chainless transmission mechanism of the present invention comprises a substantially L-shaped right bottom bracket bearing axle holder 10 and a left bottom bracket bearing axle holder 30 respectively connected to the bottom bracket 1B of the bicycle frame 1A at two opposite sides to hold a bearing axle 4A.

Figure 3:
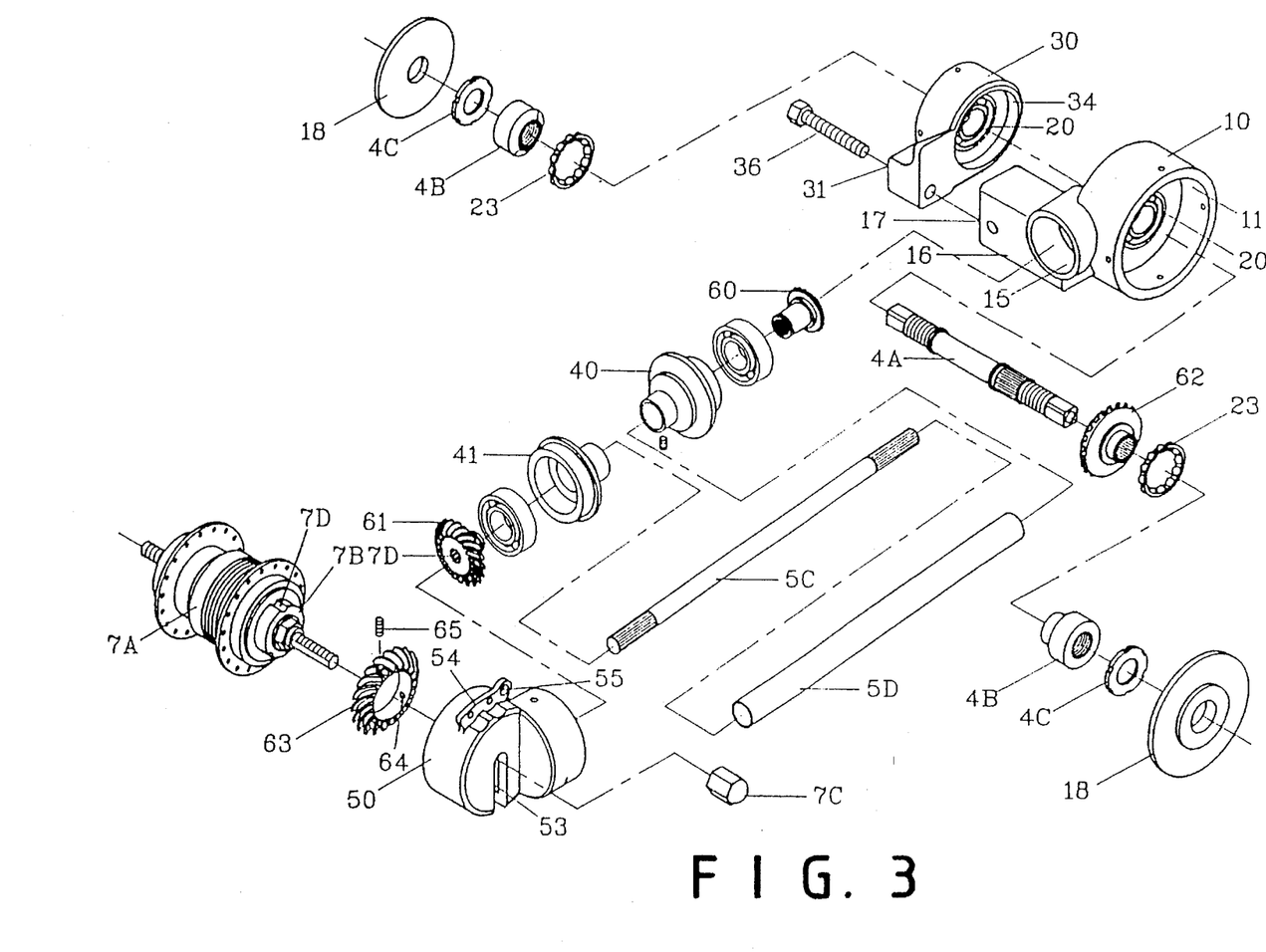
FIG. 3—explosive view of a chainless transmission mechanism according to the present invention.
Figure 4:
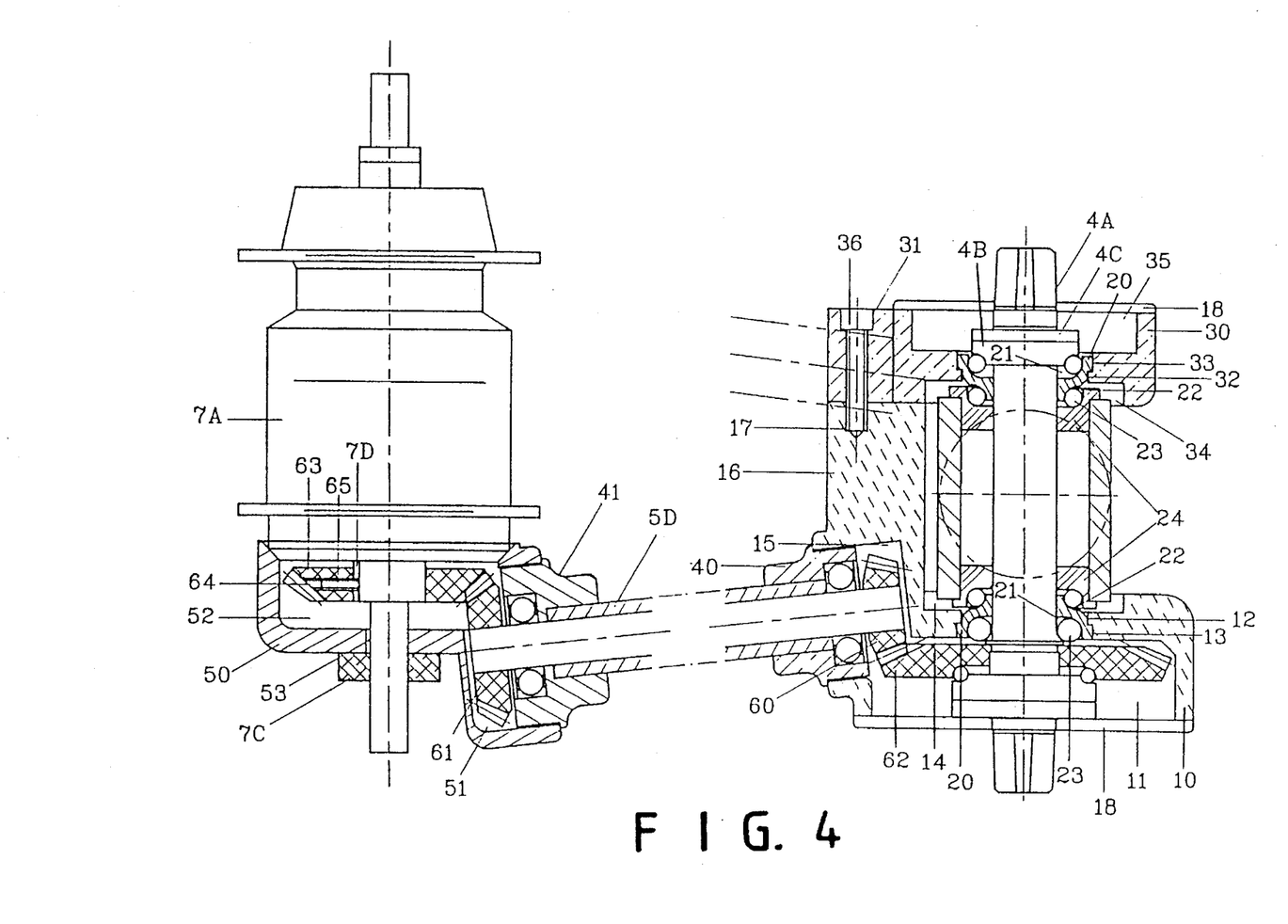
FIG. 4—top of the chainless transmission mechanism according to the present invention.
Figure 5:
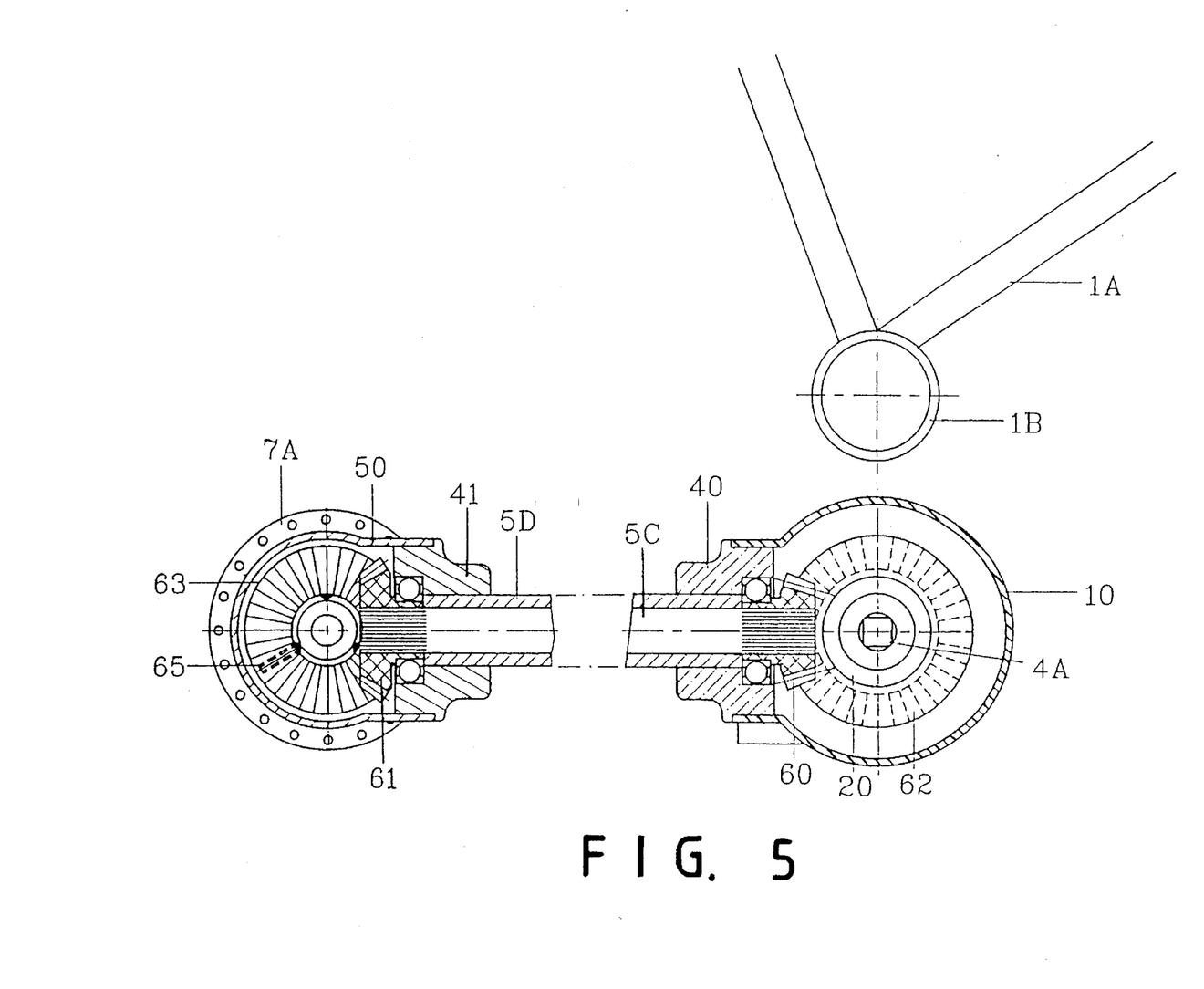
FIG. 5—a side view of the chainless transmission mechanism according to the present invention.
Figure 6:
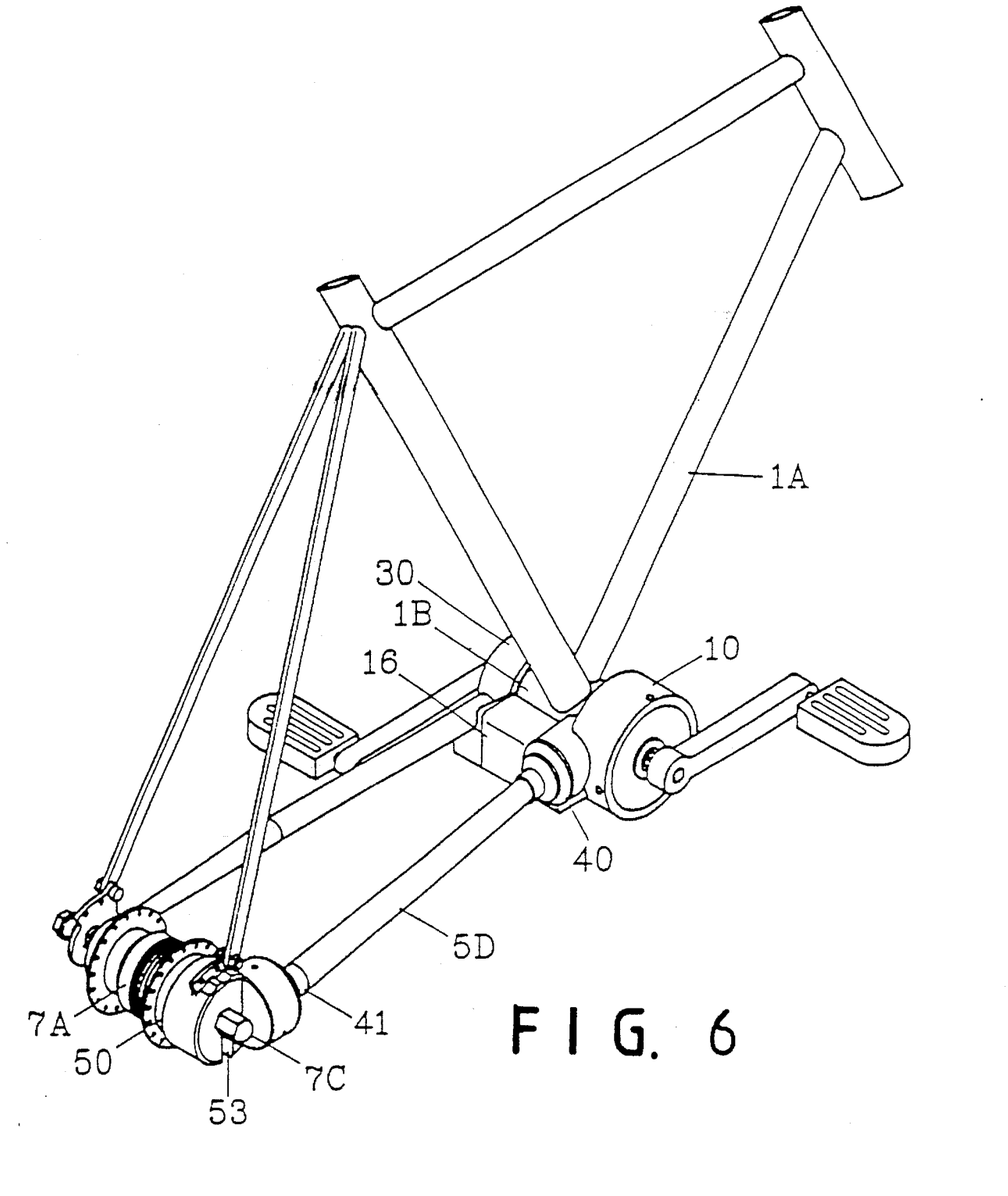
FIG. 6—bird's eye view showing the chainless transmission mechanism of the present invention installed onto the bicycle frame.
Figure 8:
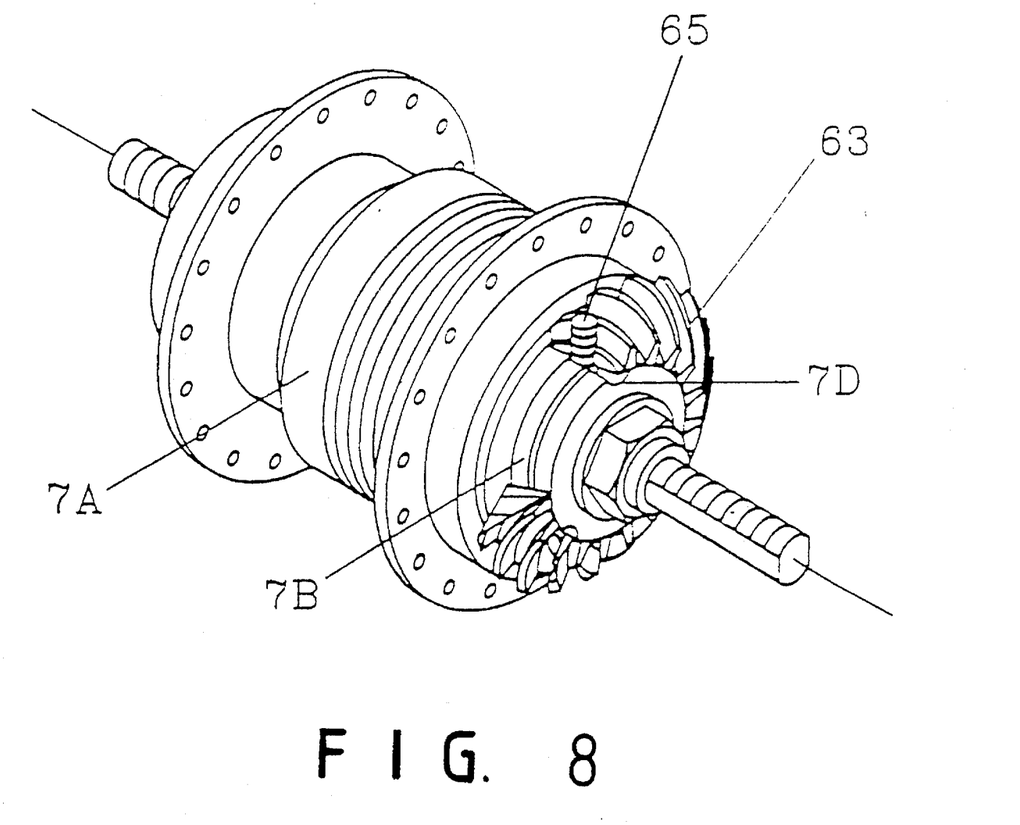
FIG. 8—enlarged view showing how the level gear mounted onto the rear wheel hub.

Referring to FIGS. 3 and 4, the right bottom bracket bearing axle holder 10 comprises a right gear chamber 11 at an outer side, an axle hole 12 through the center of the right gear chamber 11, a bearing cup's shoulder 13 around the axle hole 12, a recessed hole 14 at an inner side, a tubular coupling portion 15 at a back side perpendicular to the bearing axle 4A and partially communicated with the gear chamber 11, and a connecting block 16 perpendicularly extended from the tubular coupling potion 15. The connecting block 16 has a screw hole 17 on the end thereof connected to a countersunk hole 31 on the left bottom bracket bearing axle holder 30 by a screw bolt 36. The left bottom bracket bearing axle holder 30 comprises an axle hole 32 longitudinally aligned with the axle hole 12 on the right bottom bracket bearing axle holder 10, a bearing cup's shoulder 33 around the axle hole 32, an inner recessed hole 34 at an inner side, and an outer recessed hole 35 at an outer side. Bearing cup 20 and 22 are respectively installed in the bearing cup's shoulder 13 and 33 to hold the bearing axle 4A and bearing 23 around the bearing axle 4A, each bearing 23 contact with the contacted cone 21 of the bearing up 20 and 22. The bearing cup 20 and 22 are retained between the bearing axle 4A and the bottom bracket 1B of the bicycle frame 1A. Cone 4B and locknuts 4C are respectively fastened to the bearing axle 4A to secure it to the bearing cup 20 and 22. Cover 18 are respectively fastened to the right and left bottom bracket bearing axle holders 10 and 30 around the bearing axle 4A and covered over the right gear chamber 11 and the left gear chamber 35. A front connector 40 is fastened to the tubular coupling portion 15 to hold one end of a sleeve 5D. The sleeve 5D has an opposite end connected to a rear connector 41. The rear connector 41 is fastened to a coupling portion 51 on a gear box 50. The gear box 50 comprises an inner chamber 52, a mounting slot 53 perpendicularly downwards extended from the inner chamber 52 to the bottom and coupled to the freewheel hub 7A, and a forkend 54 with screw holes 55 for mounting. A transmission shaft 5C is fastened to the front and rear connectors 40 and 41 and received inside the sleeve 5D. Two bevel gears 60 and 61 are respectively fixedly fastened to two opposite ends of the transmission shaft 5C. A bevel gear 62 is received in the right gear chamber 11 of the right bottom bracket bearing axle holder 10 and fixedly mounted around one end of the bearing axle 4A and engaged with the bevel gear 60. A bevel gear 63 is fastened to the freewheel hub 7A and received in the inner chamber 52 and engaged with the bevel gear 61. The bevel gear 63 has a side screw hole 64. When the bevel gear 63 is mounted around the chain seat 7B of the freewheel hub 7A, a tightening up screw 65 is threaded into the side screw hole 64 and stopped at a groove 7D on the chain seat 7B to hold the bevel gear 63 (see FIGS. 5 and 8).

When the right and left bottom bracket bearing axle holders 10 and 30 are connected together by threading the screw bolt 36 from the countersunk hole 31 into the screw hole 17, the right and left bottom bracket bearing axle holders 10 and 30 can then be directly fastened to the bottom bracket 1B of the bicycle frame 1A of a regular bicycle without modifying the structure of the bottom bracket 1B. Therefore, the present invention can be used in a regular chain-drive bicycle when the chain and chain wheels are dismounted. When the bearing cup 20 and 22 are respectively fastened to two opposite sides of the bottom bracket 1B of the bicycle frame 1A, the bearings 23 are respectively fastened to the bearing cup 20, and then the bearing axle 4A is fastened to the bearings 23. When the bearing axle 4A is installed, the bevel gear 62 is fixedly mounted around one end of the bearing axle 4A, and then the cone 4B and the locknuts 4C are respectively fastened to the bearing axle 4A (see FIG. 4). When installed, the bevel gear 62 is engaged with the level geat 60 at one end of the shaft 5C.

Figure 7:
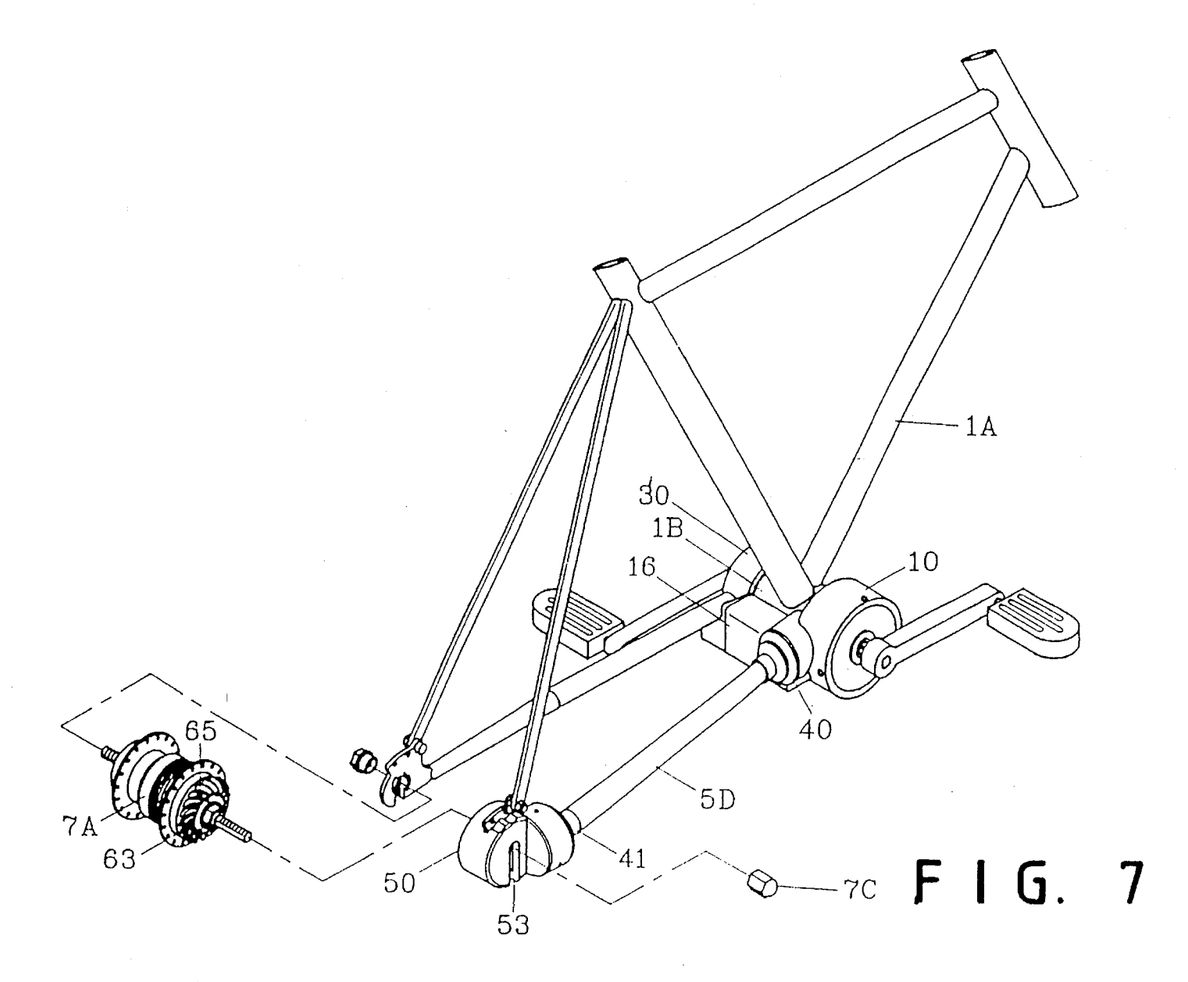
FIG. 7—bird's eye view showing how the rear wheel hub can be monuted or dismounted to or from the gear box and the bicycle frame.

As indicated, the gear box 50 is coupled to the freewheel hub 7A, having an inner chamber 52, which receives the bevel gears 61 and 63, a mounting slot 53 perpendicularly downwards extended from the inner chamber 52 to the bottom, which receives one end of the freewheel hub 7A. When the mounting slot 53 is coupled to one end of the freewheel hub 7A, a nut 7C is fastened to the freewheel hub 7A to hold with the gear box 50 (see FIGS. 6 and 7). When the nut 7C is removed from the freewheel hub 7A, the gear box 50 can be conveniently disconnected the freewheel hub 7A by pulling the bicycle frame upwards from the freewheel hub 7A without dismounting the rear fender and other parts of the bicycle. As the mounting slot 53 is a downward opening and the gravity of the rider forces the gear box 50 downwards, the wheel hub 7A does not jump out of position during the moving of the bicycle. Furthermore, because the bevel gear 63 is directly mounted on the chain seat 7B of the freewheel hub 7A by the tightening up screw 65, it is not necessary to dismount the chain seat 7B from the original freewheel hub 7A. Therefore, the chainless transmission mechanism of the present invention can be conveniently installed in a regular chain-drive bicycle to replace its original chain transmission mechanism.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A chainless transmission mechanism of the type comprising a right bottom bracket bearing axle holder and a left bottom bracket bearing axle holder bilaterally connected to the bottom bracket of a bicycle, a bearing axle disposed in said right and left bottom bracket bearing axle holders and said bottom bracket, a gear box coupled to the freewheel hub of said bicycle, a sleeve connected between said right bottom bracket bearing axle holder and said gear box, a transmission shaft received in said sleeve, a first pair of bevel gears coupled between said bearing axle and said transmission shaft, and a second pair of bevel gears coupled between said freewheel hub and said transmission shaft, wherein: said right bottom bracket bearing axle holder comprises a right gear chamber an outer side, which receives said first pair of bevel gears, an axle hole through said right gear chamber through which said bearing axle passes, a bearing cup's shoulder, a ball bearing mounted around said bearing axle within the bearing hole of said right bottom bracket bearing axle holder, a connecting tube mounted around said bearing axle and disposed within said bottom bracket at one side, a tubular coupling portion connected to one end of said sleeve by a connector, and a connecting block perpendicularly extended from said tubular coupling potion, said connecting block having a screw hole at one end; said left bottom bracket bearing axle holder comprises an axle hole through which said bearing axle passes, a bearing cup's shoulder, a ball bearing mounted around said bearing axle within the bearing hole of said left bottom bracket bearing axle holder, a connecting tube mounted around said bearing axle and disposed within said bottom bracket at an opposite side, a countersunk hole connected to the screw hole on said connecting block of said right bottom bracket bearing axle holder by a screw bolt; said gear box comprises an inner chamber, which receives said second pair of bevel gears, a mounting slot perpendicularly downwards extended from said inner chamber and coupled to one end of said freewheel hub, the bevel gear on the wheel hub being mounted directly on the original driver of the wheel hub by tightening up screw, and a forkend at a top thereof, said forkend having a plurality of screw holes for fastening to the bicycle frame of said bicycle.

* * * * *